United States Patent Office.

EDWARD J. DE SMEDT, OF NEW YORK, N. Y.

Letters Patent No. 111,520, dated February 7, 1871.

IMPROVEMENT IN ASPHALT CEMENT FOR PAVEMENTS, DRAIN-PIPES, &c.

The Schedule referred to in these Letters Patent and making part of the same.

*To all whom it may concern:*

Be it known that I, EDWARD J. DE SMEDT, of the city, county, and State of New York, have invented a new and improved Mode of Making Asphalt Cements for Pavements, Drains, Pipes, and such like purposes; and I do hereby declare that the following is a full, clear, and exact description of the same.

The great difficulty in making a good cement having all the necessary qualities required consists often as much in the manner of mixing the ingredients as in the nature or quality of the ingredients themselves. This is particularly true of asphalt cements, for if the combination of the ingredients is not complete the cement will not have the required qualities expected and looked for from the ingredients used.

In order to obtain a good result in the making of asphalt cements for the purposes specified, and for all other purposes in which asphalt cement may be used, it will be necessary to follow closely the following mode and treatment in making or preparing the same. The proportions of the ingredients may vary some, according to circumstances.

Ingredients used in the manufacture of my improved asphalt cement:

Heavy petroleum or the residue of petroleum, one part.

Hydrated lime, one part.

Roasted brick-clay, heated to 500° Fahrenheit, or pulverized soft brick, one part.

Grahamite or Ritchie mineral, in fine powder, five per cent.

The heavy petroleum or the residuum of the same is treated to about 212° Fahrenheit. The hydrate of lime and roasted clay or soft brickdust is then added and mixed with the petroleum or the residuum of the same, and the fire increased so that the mass will be run up to about 300° Fahrenheit, at which temperature the hydrate of lime is decomposed and water evolved, which is evaporated, and caustic lime will combine with heavy petroleum or the residue of the same, so that the combinations will take place between the molecules of the foregoing bodies and make a compound on which muriatic acid will have no effect whatever. The Grahamite is added and mixed with the mass when all the ingredients are in a mass or united.

The object of the roasted clay or pulverized soft brick with the lime is to give the compound a hydraulic character.

This composition may be added to natural asphalts in different proportions and melted together, and sand, broken stone, or gravel may be added in different proportions, as required, but I advise as a good scale of proportions:

Three parts of the compound; five parts natural asphalt; thirty parts sand; thirty-five parts broken stone.

Having thus described my invention,

What I claim as new, and desire to secure by Letters Patent, is—

The combination of hydrated lime, roasted brick-clay or pulverized soft brick, with heavy petroleum or the residue of the same, and Grahamite or Ritchie mineral, with natural asphalt and sand, gravel, or an equivalent substance, all treated in the manner substantially as and for the purposes set forth.

E. J. DE SMEDT.

Witnesses:
LOUIS S. KELSEY,
J. L. GRAHAM, Jr.